United States Patent
Popuri et al.

(10) Patent No.: US 11,048,497 B1
(45) Date of Patent: Jun. 29, 2021

(54) SYSTEM AND METHOD FOR MANAGING DEPLOYMENTS

(71) Applicant: Dell Products L.P., Hopkinton, MA (US)

(72) Inventors: Tandava Venkata Krishna Popuri, Bengaluru (IN); Vaideeswaran Ganesan, Bengaluru (IN); Pravin Janakiram, Bangalore (IN); Balaji Bondhili Singh, Bangalore (IN); Suren Kumar, Vellore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/840,194

(22) Filed: Apr. 3, 2020

(51) Int. Cl.
| | |
|---|---|
| *G06F 8/65* | (2018.01) |
| *G06F 11/30* | (2006.01) |
| *G06F 11/34* | (2006.01) |
| *G06F 8/61* | (2018.01) |

(52) U.S. Cl.
CPC ............ *G06F 8/65* (2013.01); *G06F 8/61* (2013.01); *G06F 11/302* (2013.01); *G06F 11/3476* (2013.01)

(58) Field of Classification Search
CPC .......... G06F 8/65; G06F 8/61; G06F 11/3476; G06F 11/302
See application file for complete search history.

(56) References Cited

U.S. PATENT DOCUMENTS

| | | | |
|---|---|---|---|
| 7,490,073 B1* | 2/2009 | Qureshi | G06F 11/079 706/50 |
| 2012/0331455 A1* | 12/2012 | Ayachitula | G06F 8/65 717/171 |
| 2017/0177324 A1* | 6/2017 | Frank | G06F 16/173 |

OTHER PUBLICATIONS

Levy, "Best Practices in Release and Deployment Management", [Online], 2013, pp. 1-10, [retrieved from internet on Apr. 19, 2021] , <https://www.datamanager.it/wp-content/uploads/2015/03/Serena-Best-Practices-in-Release-and-Deployment-Management.pdf>, (Year: 2013).*

Li et al, "Update schedules for improving consistency in multi-server distributed virtual environments", [Online], 2014, pp. 263-273, [Retrieved from internet on Apr. 19, 2021], <https://pdf.sciencedirectassets.com/272436/1-s2.0-S1084804514X00044/1-s2.0-S1084804514000083/main.pdf?X-Amz-Date=20210419T>, (Year: 2014).*

* cited by examiner

*Primary Examiner* — S. Sough
*Assistant Examiner* — Zengpu Wei
(74) *Attorney, Agent, or Firm* — Chamberlain, Hrdlicka, White, Williams & Aughtry

(57) ABSTRACT

A deployment consistency orchestrator includes storage for storing a manual update practice repository and a deployment characteristics repository. The orchestrator further includes an automated update practices manager that identifies a change in update practice event for a deployment; in response to identifying the change in update practice event: identifies, using the deployment characteristics repository, a (Continued)

portion of deployments having a classification that is similar to a classification of the deployment; identifies a portion of the manual update practices repository associated with the portion of the deployments; performs a commonality analysis using the portion of the manual update practices to identify consistent update practices associated with the classification of the deployment; and enforces the consistent update practices associated with the classification on the deployment.

20 Claims, 12 Drawing Sheets

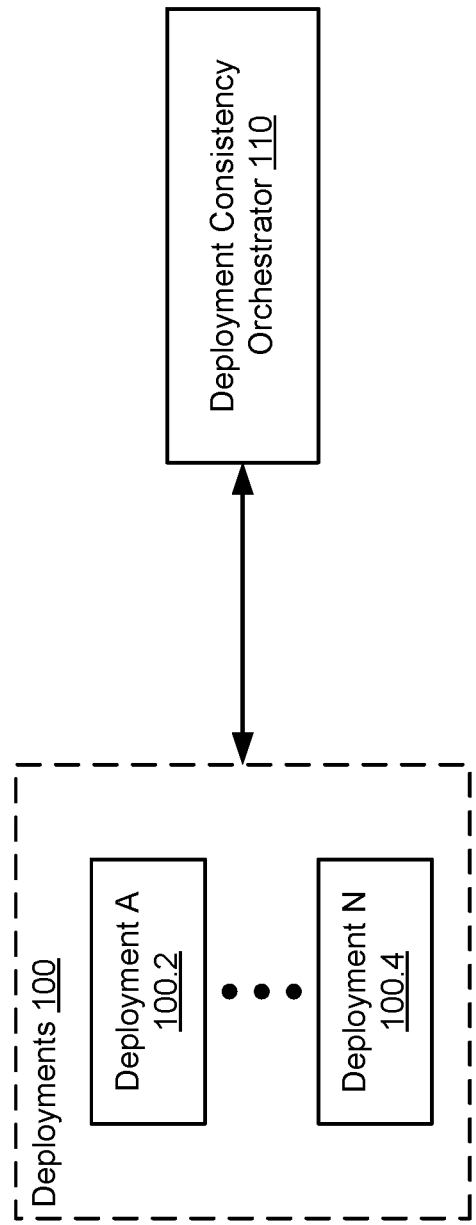
FIG. 1.1

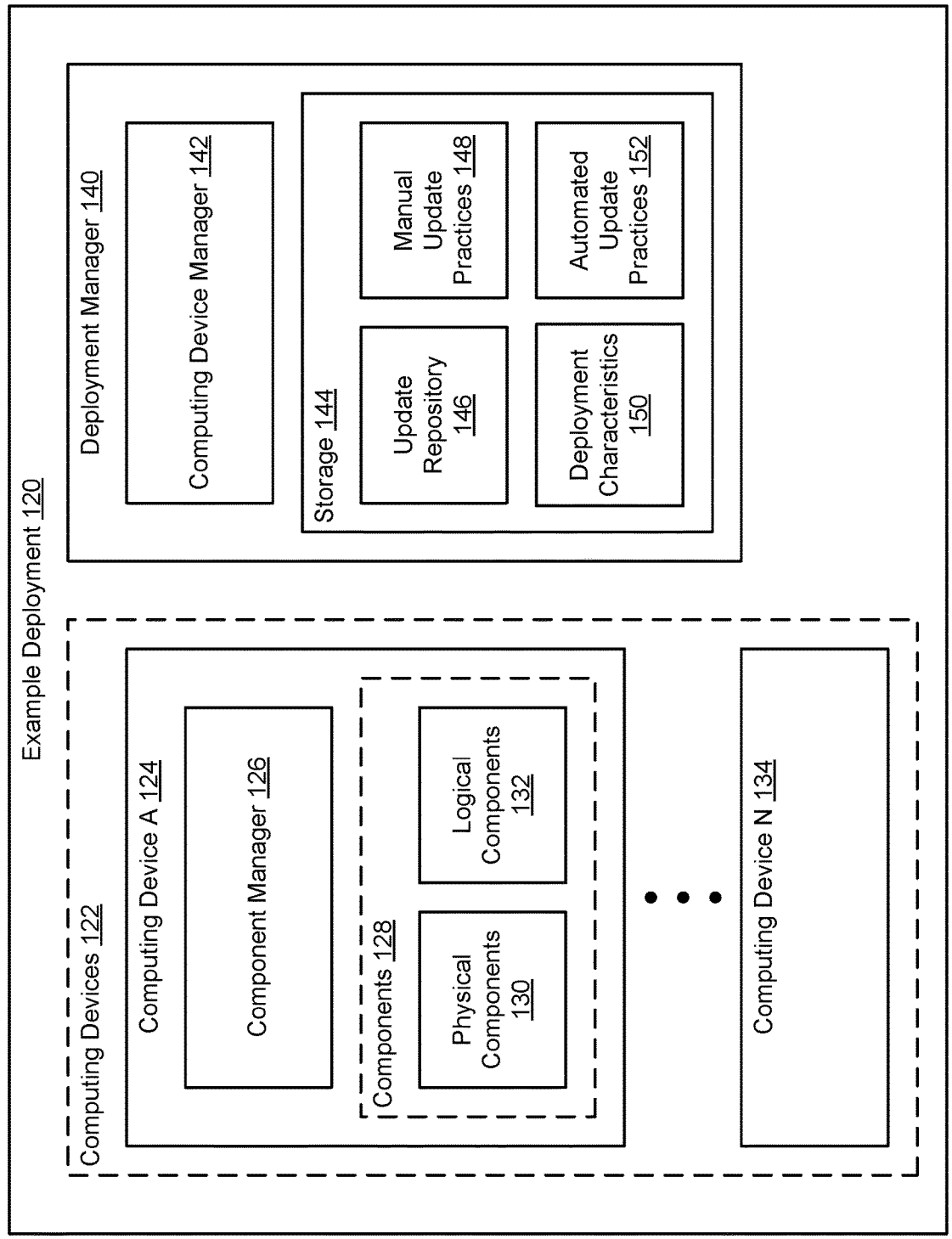
FIG. 1.2

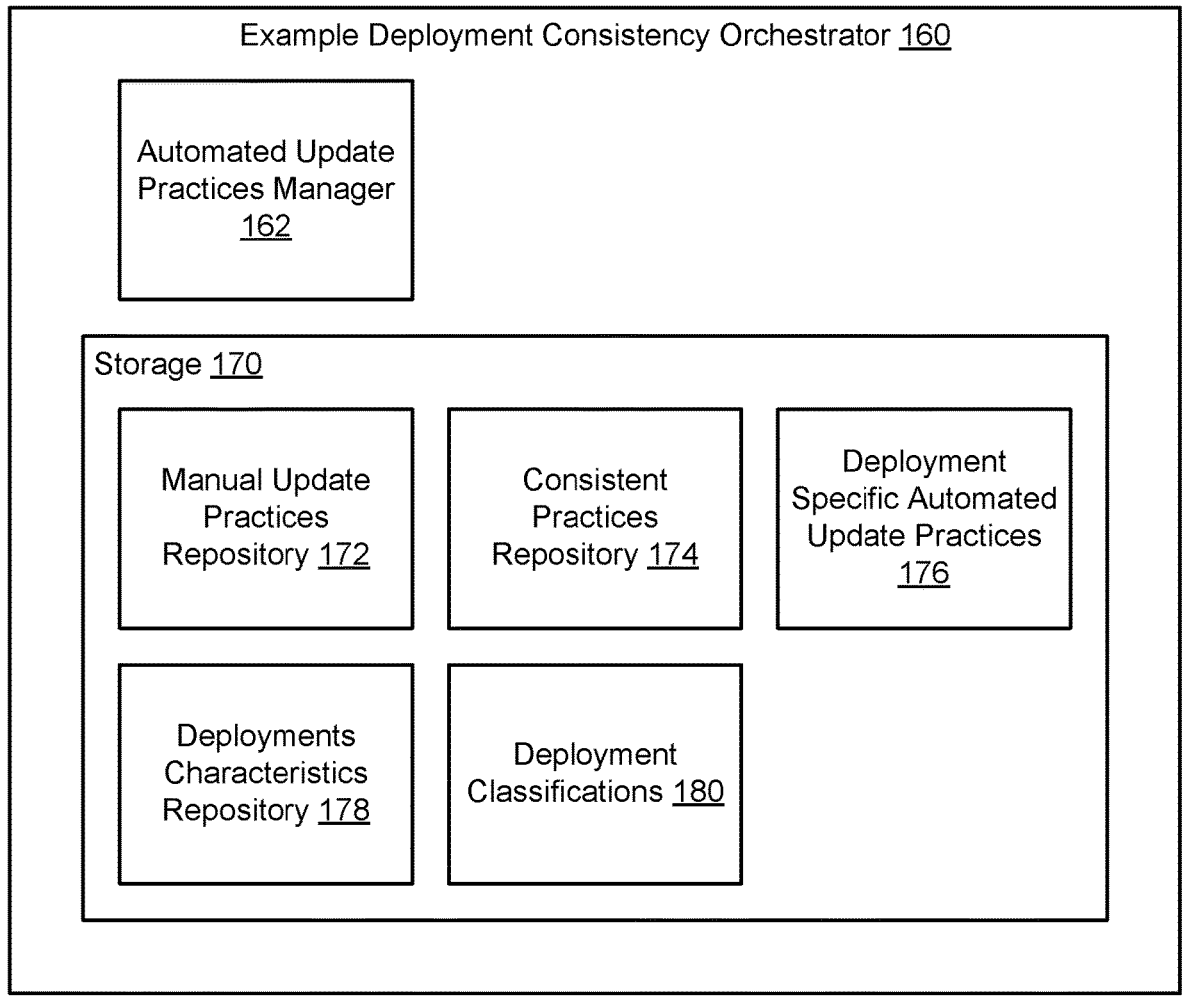
FIG. 1.3

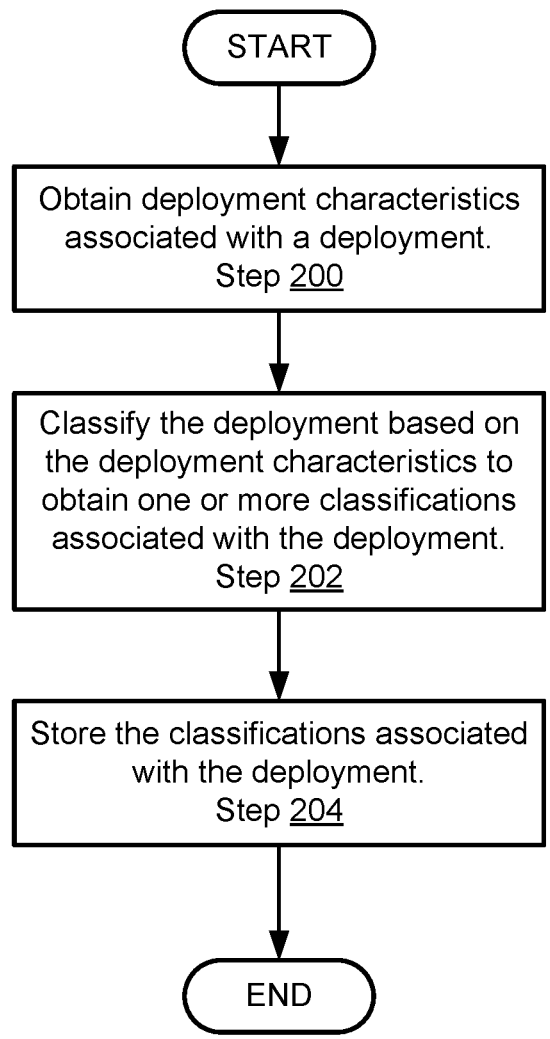
FIG. 2.1

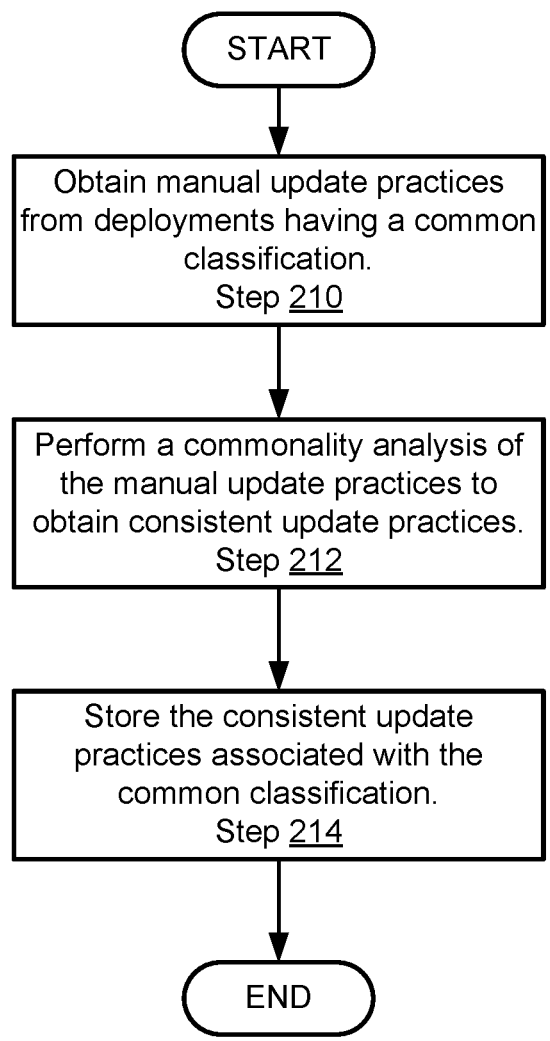
FIG. 2.2

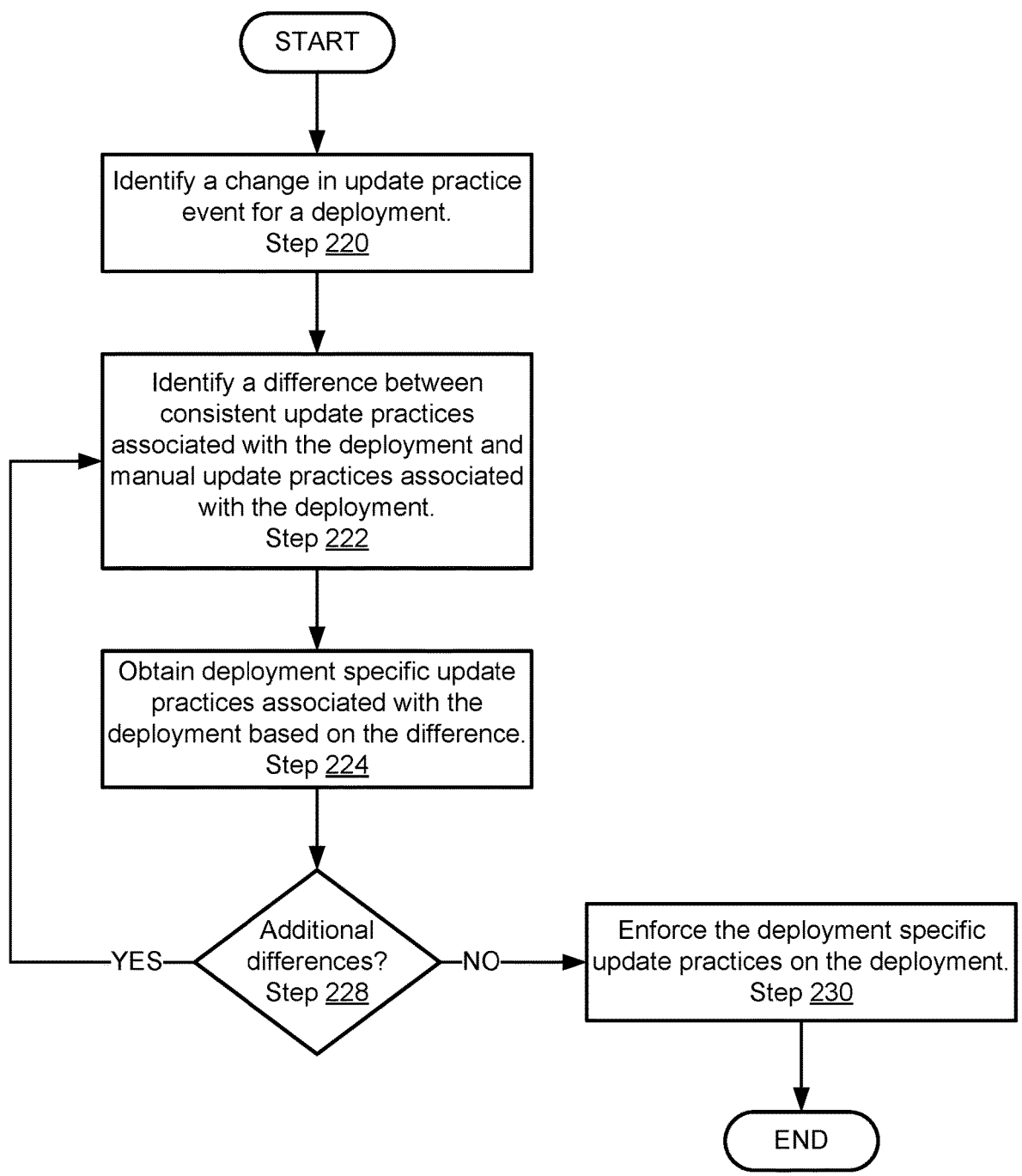
FIG. 2.3

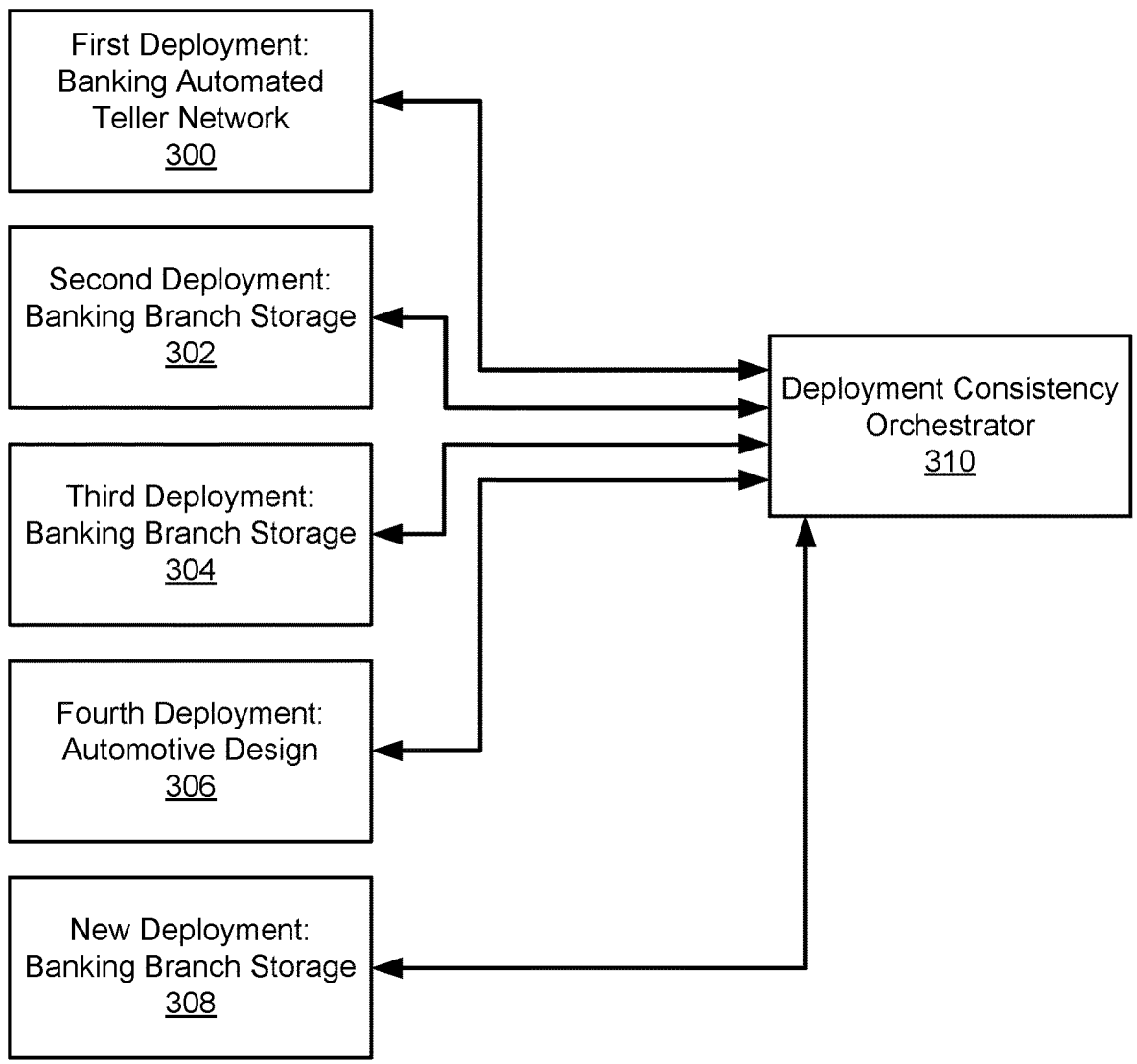
FIG. 3.1

| Update Practice | First Deployment | Second Deployment | Third Deployment | Fourth Deployment | Consistent Update Practices |
|---|---|---|---|---|---|
| Classification | Banking - distributed | Banking - local | Banking - local | Automotive - design | |
| Update Status | 70% complete | 42% complete | 58% complete | 90% complete | |
| Update Frequency | 12% 1-3 months<br>33% 4-7 months<br>65% 7-12 months | 33% 1-4 months<br>33% 4-7 months<br>33% 7-12 months | 33% - 1-3 months<br>33% - 4-7 months<br>33% - 7-12 months | 90% 1-3 months<br>8% 4-7 months<br>2% 7-12 months | |
| Frequently Updated Components and Average Time Between Updates | MC (4 months)<br>NIC (6 months)<br>OS drivers (12 months) | MC (16 months)<br>NIC (18 months)<br>OS drivers (2 months) | MC (18 months)<br>NIC (15 months)<br>OS drivers (1 months) | MC (18 months)<br>NIC (3 months)<br>OS drivers (6 months) | |

FIG. 3.2

| Update Practice | First Deployment | Second Deployment | Third Deployment | Fourth Deployment | Consistent Update Practices |
|---|---|---|---|---|---|
| Classification | Banking - distributed | Banking - local | Banking - local | Automotive-design | |
| Update Status | 70% complete | 42% complete | 58% complete | 90% complete | |
| | 12% 1-3 months | 33% 1-4 months | 33% - 1-3 months | 90% 1-3 months | |
| | 33% 4-7 months | 33% 4-7 months | 33% - 4-7 months | 8% 4-7 months | |
| | 65% 7-12 months | 33% 7-12 months | 33% - 7-12 months | 2% 7-12 months | |
| Update Frequency | MC (4 months) | MC (16 months) | MC (18 months) | MC (18 months) | |
| | NIC (6 months) | NIC (18 months) | NIC (15 months) | NIC (3 months) | |
| Frequently Updated Components and Average Time Between Updates | OS drivers (12 months) | OS drivers (2 months) | OS drivers (1 months) | OS drivers (6 months) | |

FIG. 3.3

| Update Practice | Second Deployment | Third Deployment | Consistent Update Practices |
|---|---|---|---|
| Classification | Banking - local | Banking - local | |
| Update Status | 42% complete | 58% complete | 50% |
| Update Frequency | 33% 1-4 months<br>33% 4-7 months<br>33% 7-12 months | 33% - 1-3 months<br>33% - 4-7 months<br>33% - 7-12 months | 33% - 1-3.5 months<br>33% - 4-7 months<br>33% - 7-12 months |
| Frequently Updated Components and Average Time Between Updates | MC (16 months)<br>NIC (18 months)<br>OS drivers (2 months) | MC (18 months)<br>NIC (15 months)<br>OS drivers (1 months) | MC (17 months)<br>NIC (16.5 months)<br>OS drivers (1.5 months) |

FIG. 3.4

| Update Practice Classification | New Deployment | Consistent Update Practices | Deployment Specific Automated Update Practice |
|---|---|---|---|
| Update Status | Banking - local 50% complete | Banking - local 50% | No Change |
| | 33% 1-6 months<br>33% 6-8 months<br>33% 8-12 months | 33% - 1-3.5 months<br>33% - 4-7 months<br>33% - 7-12 months | 33% - 1-3.5 months<br>33% - 4-7 months<br>33% - 7-12 months |
| Update Frequency | | | |
| Frequently Updated Components and Average Time Between Updates | MC (20 months)<br>NIC (2 months)<br>OS drivers (1.5 months) | MC (17 months)<br>NIC (16.5 months)<br>OS drivers (1.5 months) | MC (17 months)<br>NIC (16.5 months)<br>OS drivers (1.5 months) |

FIG. 3.5

SYSTEM AND METHOD FOR MANAGING DEPLOYMENTS

BACKGROUND

Multiple computing devices may cooperate to provide computer implemented services. One or more persons (e.g., administrators) may be tasked with managing the computing devices. Managing a computing device may include ensuring that the operation of the computing device is up to date. For example, when a computing device is provided, the provider may continue to develop software that may improve the operation of the computing device.

SUMMARY

In one aspect, a deployment consistency orchestrator for providing update consistency services to deployments in accordance with one or more embodiments of the invention includes storage for storing: a manual update practice repository for storing manual update practices associated with respective deployments, and a deployment characteristics repository for storing characteristics associated with respective deployments; and an automated update practices manager that identifies a change in update practice event for a deployment of the deployments; in response to identifying the change in update practice event: identifies, using the deployment characteristics repository, a portion of the deployments having a classification that is similar to a classification of the deployment; identifies a portion of the manual update practices repository associated with the portion of the deployments; performs a commonality analysis using the portion of the manual update practices to identify consistent update practices associated with the classification of the deployment; and enforces the consistent update practices associated with the classification of the deployment on the deployment.

In one aspect, a method for providing update consistency services to deployments in accordance with one or more embodiments of the invention includes identifying a change in update practice event for a deployment of the deployments; in response to identifying the change in update practice event: identifying, using a deployment characteristics repository that stores characteristics associated with respective deployments, a portion of the deployments having a classification that is the same as a classification of the deployment; identifying a portion of a manual update practices repository associated with the portion of the deployments, wherein the manual update practices repository stores update practices associated with respective deployments; performing a commonality analysis using the portion of the manual update practices to identify consistent update practices associated with the classification of the deployment; and enforcing the consistent update practices associated with the classification of the deployment on the deployment.

In one aspect, a non-transitory computer readable medium in accordance with one or more embodiments of the invention includes computer readable program code, which when executed by a computer processor enables the computer processor to perform a method for providing update consistency services to deployments, the method includes identifying a change in update practice event for a deployment of the deployments; in response to identifying the change in update practice event: identifying, using a deployment characteristics repository that stores characteristics associated with respective deployments, a portion of the deployments having a classification that is the same as a classification of the deployment; identifying a portion of a manual update practices repository associated with the portion of the deployments, wherein the manual update practices repository stores update practices associated with respective deployments; performing a commonality analysis using the portion of the manual update practices to identify consistent update practices associated with the classification of the deployment; and enforcing the consistent update practices associated with the classification of the deployment on the deployment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a deployment in accordance with one or more embodiments of the invention.

FIG. 1.3 shows a diagram of a deployment consistency orchestrator in accordance with one or more embodiments of the invention.

FIG. 2.1 shows a flowchart of a method of classifying deployments in accordance with one or more embodiments of the invention.

FIG. 2.2 shows a flowchart of a method of obtaining consistent update practices in accordance with one or more embodiments of the invention.

FIG. 2.3 shows a flowchart of a method of enforcing update practices in accordance with one or more embodiments of the invention.

FIG. 3.1 shows a diagram of a non-limiting example of a system in accordance with embodiments of the invention.

FIGS. 3.2-3.5 show diagrams of data used by the system of FIG. 3.1 in accordance with embodiments of the invention.

DETAILED DESCRIPTION

Figure 4:
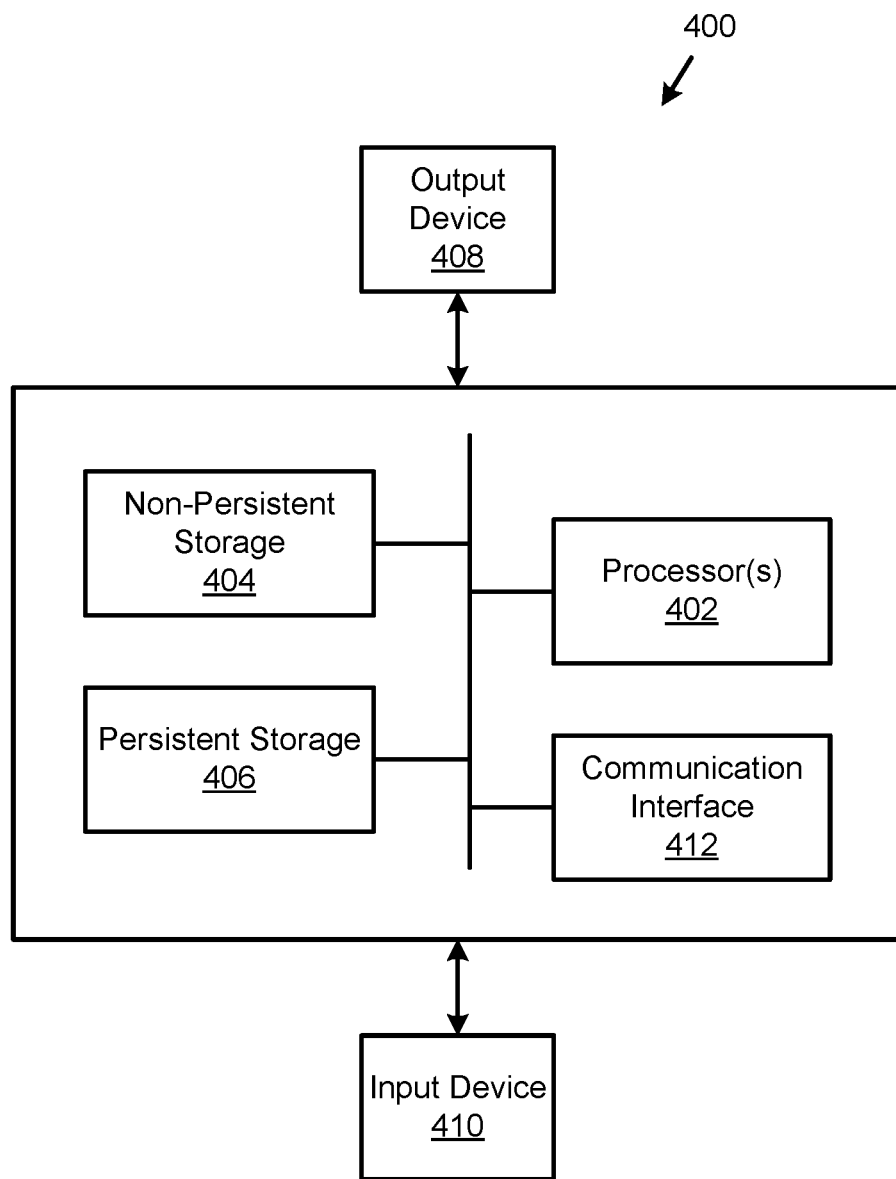
FIG. 4 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing update practices employed by deployments. A deployment may be a collection of computing devices that may cooperatively provide one or more functionalities. Each of the computing devices may include components that may be updated mover time. Updating a component may change the manner in which the component operates which, in turn, may impact the manner in which the deployment operates.

Application of an update to a component may, in part, positively impact the operation of the component and/or, in part, negatively impact the operation of the component. For example, applying a firmware update may cause a component to which the update was applied to consume less power to perform its functionality. In another example, applying an operating system may make a computing to which the update was applied more susceptible to malicious attack. Thus, applying an update may provide benefits and/or detriments to the operation of the deployment.

Embodiments of the invention may provide a system and method for managing the risks associated with electing to apply an update, delay application of an update, and/or not apply an update. To do so, a system in accordance with embodiments of the invention may identify update practices that are commonly employed by administrators of deployments of a particular type. The system may then enforce the common update practices across deployments of the particular type. By doing so, updates that are more likely to be beneficial may be automatically applied to deployments while updates that are more likely to be detrimental may be avoided and/or delayed until the deficiencies in the updates leading to them being detrimental are remediated. Accordingly, a system in accordance with embodiments of the invention may have, for example, improved functionality in the form of reduced power consumption, reduced susceptibility to malicious attack, etc.

Additionally, enforcing the common update practices may reduce a cognitive burden placed on administrators of deployments by ensuring that a minimum level of update practice (i.e., a commonly implemented update application practice) is automatically implemented by a deployment. By ensuring that the minimum level of update practice is automatically implemented, the administrators may be at least partially relieved of their duty of evaluating every potential update for risks.

FIG. 1.1 shows an example system in accordance with one or more embodiments of the invention. The system may include deployments (100) that provide computer implemented services. The computer implemented services provided by each of the deployments (e.g., 100.2, 100.4) may be similar to and/or different from computer implemented services provided by other deployments.

Different deployments may be operated, owned, or otherwise controlled by different organizations that utilize their respective deployments for similar or different purposes. For example, a first deployment of the deployments (100) may be used by a financial services company that utilizes its deployment to track deposits and withdrawals at its branch bank locations. A second deployment of the deployments (100) may be used by an automobile manufacture for modeling (e.g., computer aided design) its next generation car products. Consequently, the use cases and manner of operation of each of the deployments may vary.

As will be discussed in greater detail with respect to FIG. 1.2, each of the deployments (100) may utilize computing devices to provide their respective computer implemented services. The manner of operation of the computing devices of each deployment may impact the overall operation of each of the respective deployments.

Over time, the manner in which a computing device operates may change due to updates applied to the computing device. For example, firmware driver updates, application updates, driver updates, and/or other types of updates may become available for application to the computing devices of the deployment. If an update is applied to a computing device, the update may change the operation of one or more physical components (e.g., processors, network interface cards, storage devices, etc.) or logical components (e.g., drivers, operating systems, applications, etc.) of a deployment. Consequently, the changed operation of the computing device due to application of the update may impact the manner in which the deployment provides its computer implemented services and/or general operation.

When an update is applied to a computing device, the new manner of operation of the computing device may be beneficial (e.g., improves efficiency of performing operations, decreases power consumption, provides new capabilities, eliminates operational bugs, reduces susceptibility to malicious attacks, etc.) and/or detrimental (e.g., reduces efficiency of performing operations, increases power consumption, introduces bugs, increases susceptibility to malicious attacks, etc.). Additionally, all of the impacts of the new operation of the computing device may not be known at the time of application. Consequently, there is some risk that application of an update may be detrimental to the operation of a deployment.

Similarly, delaying application (or not applying) of an update may also be beneficial and/or detrimental. By delaying application of an update, the benefits of applying the update may not be conferred on the deployment. However, the potential detriments associated with applying an update may be avoided.

Embodiments of the invention may provide a method and/or system for managing the application of updates to deployments. Embodiments of the invention may provide methods for identifying best practices for applying updates to different deployments on a granular level (e.g., per deployment level) and/or in a targeted manner. Specifically, a system in accordance with embodiments of the invention may identify characteristics of a deployment (e.g., a deployment classification) that indicate that a particular set of update practices (e.g., when, how, whether, etc. an update that becomes available for application should be applied) should be implemented by the deployment. The particular set of update practices may reflect practices commonly implemented by deployments of similar classifications. By implementing the particular set of update practices, the deployment may be placed in a state of operation that is consistent with other, similarly classified deployments.

By doing so, the risks of applying or not applying updates that are made available for application to computing devices of a deployment may be balanced against the benefits of applying or not applying the updates. Consequently, the operation of the deployment may be improved by improving the likelihood that updates that are more beneficial to the deployment are applied while reducing the likelihood that updates that are more detrimental to the deployment are not applied.

To provide the above noted functionality, the system of FIG. 1.1 may also include a deployment orchestrator (110).

The deployment orchestrator (110) may provide update practice management services. The update practice management services may include enforcing update practices tailored to each of the deployments that are based on a minimum update practices standard. By doing so, the system of FIG. 1.1 may provide deployments (100) that implement update practices that are more likely to improve the operation of the deployments when compared to deployments for which the update practices are merely governed by decisions made by administrators. For additional details regarding deployment orchestrators, refer to FIG. 1.3.

The components of the system illustrated in FIG. 1.1 may be operably connected to each other and/or operably connected to other entities (not shown) via any combination of wired and/or wireless networks. Each component of the system illustrated in FIG. 1.1 is discussed below.

The deployments (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.3. The deployments (130) may be implemented using other types of computing devices without departing from the invention. For additional details regarding computing devices, refer to FIG. 4.

The deployments (130) may be implemented using logical devices without departing from the invention. For example, the deployments (130) may be implemented using virtual machines that utilize computing resources of any number of physical computing devices to provide the functionality of the deployments (130). The deployments (130) may be implemented using other types of logical devices without departing from the invention.

In one or more embodiments of the invention, the deployments (130) provide computer implemented services. For example, the deployments (130) may provide database services, electronic communication services, file storage services, or any other types of computer implemented services. Each of the deployments (130) may provide any number of types and/or quantities of computer implemented services. Different deployments may provide similar and/or different computer implemented services. The system of FIG. 1.1 may include any number of deployments.

Each of the deployments may be associated with one or more corresponding organizations. The corresponding organizations may be, for example, companies. Each of the companies may be associated with an industry. For example, a company that produces automobiles may be associated with the automotive industry. In another example, a company that provides banking services may be associated with the banking industry.

Each of these industries (to which the deployments are associated) may have different needs regarding their deployments. Consequently, the update practices (e.g., manual update practices implemented by administrators of those deployments) implemented by each industry may be different. However, the aforementioned update practices implemented by an industry may not be known due to, for example, competition between different segments in the industry. Consequently, any organization in an industry may be unaware of the update practices commonly employed throughout the industry. Because the common update practices are unknown, each organization's update practices may be similar to (in whole or in part) or different from (in whole or in part) the common update practices associated with the industry.

Additionally, different deployments controlled by an organization may be used for different purposes. For example, consider a scenario where a company that provides financial services uses a first deployment to provide communication services among its representatives and a second deployment to store financial information of its customers. Due to the different uses of these deployments, the structures of these deployments may be different and the update practices implemented for each of these deployments may be different even though both deployments are associated with the same industry. Consequently, even in a same industry, different deployments utilized for different uses and/or having different structures may be associated with common update practices (e.g., update practices associated with a use type) that are different even through both are used by an organization in single industry.

The deployment consistency orchestrator (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.3. The deployment consistency orchestrator (110) may be implemented using other types of computing devices without departing from the invention. For additional details regarding computing devices, refer to FIG. 4.

The deployment consistency orchestrator (110) may be implemented using logical devices without departing from the invention. For example, the deployment consistency orchestrator (110) may be implemented using virtual machines that utilize computing resources of any number of physical computing devices to provide the functionality of the deployment consistency orchestrator (110). The deployment consistency orchestrator (110) may be implemented using other types of logical devices without departing from the invention.

In one or more embodiments of the invention, the deployment consistency orchestrator (110) provides update practice management services. Update practice management services may include (i) obtaining information regarding the manual update practices employed by administrators of the deployments (100), (ii) classifying the deployments into groups, (iii) identifying common update practices for each of the groups based on the manual update practices associated with each deployment of each respective group, and/or (iv) enforcing the consistent update practices associated with each group on the deployments of the groups. By doing so, embodiments of the invention may provide deployments that are more likely to obtain the potential benefits offered by applying updates and avoid the potential detriments associated with the updates.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention.

As discussed above, the deployments (130) may provide computer implemented services. FIG. 1.2 shows a diagram of an example deployment (120) in accordance with one or more embodiments of the invention. The example deployment (120) may be similar to any of the deployments (e.g., 100.2, 100.4) discussed with respect to FIG. 1.1. As discussed above, the example deployment (120) may provide computer implemented services.

To provide the aforementioned functionality of the example deployment (120), the example deployment (120) may include computing devices (122, 134) and a deployment manager (140). Each component of the example deployment (120) is discussed below.

The computing devices (122) may cooperatively provide all, or a portion, of the computer implemented services provided by the example deployment (120). The computing devices (122) may provide the computer implemented services in any manner without departing from the invention. The example deployment (120) may include any number of computing devices (e.g., 124, 134). All, or a portion, of the computing devices of FIG. 1.2 may be similar to the computing device illustrated in FIG. 4.

To cooperatively provide computer implemented services, one or more of the computing devices (e.g., 124) may include a component manager (126) and any number of components (128).

The components (130) may include any number of physical components (130) (e.g., processors, network interface card, storage controllers, etc.) and/or logical components (132) (e.g., operating systems, drivers, applications, etc.). The logical components (132) may be implemented using computer instructions (e.g., computer code) stored on a non-transitory computer readable medium that when executed by a physical component (e.g., a processor) gives rise to the logical component. The physical and logical components of the respective computing devices may perform actions when a computing device is operating that give rise to the functionality of the computing device. The operation of any of the components (128) may be changed by applying an update.

For example, an update may include a firmware update for a physical component that when applied to the physical component causes the physical component to operate in a different manner than the manner in which the physical component operated prior to application of the update. In another example, an update may include a software update that when applied to an operating system of the computing device causes the operating system to operate in a different manner than the manner in which the operating system operated prior to application of the update. An update may include any number and type of updates that, when applied to physical and/or logical components, causes any number of the hardware components (130) and/or the logical components (132) to operate differently after application of the update.

Updates may be applied to the components (128) manually (e.g., application of the updated initiated by a person) or in an automated manner (e.g., initiated by a non-person entity such a deployment manager). To facilitate automated application of updates and identification of manually applied updates, each of the computing devices (122) may include a component manager (126).

The component manager (126) may provide component update management services. Providing component update management services may include (i) obtaining information regarding manual application of updates to the components, (ii) providing the obtained information to a deployment manager (e.g., 140) and/or other entities, (iii) obtaining updates that are to be automatically applied to one or more of the components (128), and (iv) automatically applying the obtained updates. By providing component update management services, information regarding update practices implemented on the computing devices of the example deployment (120) may be obtained and updates that may place the computing devices (122) of the example deployment (120) in compliance with common update practices for the type of the example deployment (120) may be enforced on the computing devices (122).

In one or more embodiments of the invention, the component manager (126) is implemented using a hardware device including circuitry. The hardware device may be, for example, a digital signal processor, a field programmable gate array, or an application specific integrated circuit. The component manager (126) may be implemented using other types of hardware devices without departing from the invention.

In one or more embodiments of the invention, the component manager (126) is implemented using computing code stored on a persistent storage that when executed by a processor performs the functionality of the component manager (126). The processor may be a hardware processor including circuitry such as, for example, a central processing unit or a microcontroller. The processor may be implemented using other types of hardware devices for processing digital information without departing from the invention.

While the computing devices (122) have been described and illustrated as including a limited number of components for the sake of brevity, a computing device in accordance with embodiments of the invention may include additional, fewer, and/or different components than those illustrated in FIG. 1.2 without departing from the invention.

The deployment manager (140) may provide deployment management services. Deployment management services may include (i) obtaining information regarding updates manually applied to components of the computing devices (122), (ii) providing the information to other entities (e.g., a deployment consistency orchestrator), (iii) obtaining information that may be used to identify a type of the example deployment (120) to other entities (e.g., a deployment consistency orchestrator), and (iv) enforcing update practices on the computing devices (122) to cause the example deployment (120) to comply with common update practices.

To provide the above noted functionality, the deployment manager (140) may include a computing device manager (142) and a storage (144). Each of these components is discussed below.

The computing device manager (142) may provide the above noted functionality of the deployment manager (140). To provide the aforementioned functionality, the computing devices manager (142) may include functionality to (i) obtain information from the computing devices (e.g., manual application of updates, information regarding the components, etc.) and (ii) cause the component manager (126) to apply updates.

To provide its functionality, the computing device manager (142) may send instructions via messages or other signaling methods to the component managers of the computing devices (122). The component managers may perform the instructions (e.g., obtaining and providing information, applying updates, etc.) in response to receiving the instructions.

When providing its functionality, the computing device manager (142) may store and utilize data structures in storage (144).

In one or more embodiments of the invention, the computing device manager (142) is implemented using a hardware device including circuitry. The hardware device may be, for example, a digital signal processor, a field programmable gate array, or an application specific integrated circuit. The computing device manager (142) may be implemented using other types of hardware devices without departing from the invention.

In one or more embodiments of the invention, the computing device manager (142) is implemented using computing code stored on a persistent storage that when executed by a processor performs the functionality of the computing device manager (142). The processor may be a hardware processor including circuitry such as, for example, a central processing unit or a microcontroller. The processor may be implemented using other types of hardware devices for processing digital information without departing from the invention.

In one or more embodiments disclosed herein, the storage (144) is implemented using devices that provide data storage services (e.g., storing data and providing copies of previously stored data). The devices that provide data services may include hardware devices and/or logical devices. For example, storage (144) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (144) may include a memory device (e.g., a dual in line memory device) in which data is stored and from which copies of previously stored data are provided. In another example, storage (144) may include a persistent storage device (e.g., a solid state disk drive) in which data is stored and from which copies of previously stored data is provided. In a still further example, storage (144) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (144) may store data structures including an update repository (146), manual update practices (148), deployment characteristics (150), and automated update practices (152). Each of these data structures is discussed below.

The update repository (146) may be a data structure that includes information regarding updates that may be applied to any of the components (e.g., 128) of the computing devices (122) of the example deployment (120). For example, the update repository (146) may include any number of updates (e.g., data structures). The update repository (146) may include any number and/or type of updates. The update repository (146) may be modified over time to add and/or remove updates.

The update repository (146) may also include, for example, information regarding (e.g., metadata) any number of the updates at any level of granularity. For example, the update repository (146) may include information regarding to which components an update is relevant (e.g., may be applied), a relationship (e.g., version number) between an update and one or more other updates, to which components an update has been applied, etc.

The manual update practices (148) may be a data structure that includes information regarding the updates that have and/or have not been applied to components by administrators of the example deployment. As noted above, administrators may selectively apply updates once the updates become available. Thus, even though an update has become available for application, the update may or may not be applied to relevant components of the example deployment.

The information included in the manual practices (148) may include one or more of (i) the current states of application of the updates included in the update repository (146) and/or stored in other locations, (ii) the frequency at which updates are applied to the components of the example deployment, (iii) statistic information regarding the application of updates to different types of components of the example deployment, (iv) listings of components for which updates are applied at different frequencies, and/or (v) other information that may be used to identify (e.g., directly, through deduction, etc.) the update practices being employed by the administrator(s) of the example deployment.

For example, the information included in the manual update practices (148) may specify the rate (e.g., time between when an update becomes available and when the update is applied) at which firmware updates are applied to different types of physical components (e.g., processors, memory modules, storage devices, network interface controllers, etc.). In another example, the information included in the manual update practices (148) may specify the rate at which operating system updates are applied to operating system (e.g., a logical component) of the computing devices of the example deployment.

The deployment characteristics (150) may be a data structure that includes information that may be used to classify the example deployment (120). The information may include, for example, one or more of (i) a name of a company that has rights (e.g., operator, user, etc.) in the example deployment (120), (ii) a type of business that the company conducts using the example deployment (120), (iii) a description (e.g., listing) of the physical components of the example deployment (120), (iv) a description (e.g., listing) of the logical components of the example deployment (120), (v) use rates (e.g., statistic information) of the physical components by the logical components, (vi) listings of commonly performed workloads by the computing devices (122), and/or (vii) topological information (e.g., connectivity between the computing devices (122), logical groupings of the computing devices into different portions based on, for example, similarly performed functions, etc.) regarding the computing devices (122).

As will be discussed below, all or a portion of the information included in the deployment characteristics (150) may be used to classify the example deployment (120) into one or more classification groups.

The automated update practices (152) may be a data structure that includes information regarding update practices that are to be enforced on the example deployment. The automated update practices (152) may specify, for example, workflows that cause updates included in the update repository (146) to be applied to the components of the example deployment (140). The information included in the automated update practices (152) may be obtained from a deployment consistency orchestrator (160). Consequently, the deployment consistency orchestrator (160) may enforce update practices on the example deployment (140) may providing all, or a portion, of the information included in the automated update practices.

The workflows may specify, for example, when and/or how an update is to be applied to one or more of the components of the example deployment. The workflows may be specified at any level of granularity (e.g., apply one or more updates at any number of points in time to any number of components). The computing device manager (142) may take action (e.g., provide and/or instruct a component manager (e.g., 126) to apply an update to a component) to apply updates to the components of the example deployment (120).

While the data structures stored in storage (144) have been described as including a limited amount of specific information, any of the data structures stored in storage (144) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the deployment manager (140) has been described and illustrated as including a limited number of components for the sake of brevity, a deployment manager in accordance with embodiments of the invention may include additional, fewer, and/or different components than those illustrated in FIG. 1.2 without departing from the invention.

While the example deployment (120) has been described and illustrated as including a limited number of components for the sake of brevity, a deployment in accordance with embodiments of the invention may include additional, fewer, and/or different components than those illustrated in FIG. 1.2 without departing from the invention.

As discussed above, the deployment manager (140) may provide information to and obtain information from a deployment consistency orchestrator when managing a deployment.

FIG. 1.3 shows a diagram of an example deployment consistency orchestrator (160) in accordance with one or more embodiments of the invention. The example deployment consistency orchestrator (160) may be similar to the deployment consistency orchestrator (e.g., 110) discussed with respect to FIG. 1.1. As discussed above, the example deployment consistency orchestrator (160) may provide update practice management services. The update practice management services may enable commonly employed update practices to be identified and used to provide update practices to any number of deployments that are tailored to conform their update practices to the commonly employed update practices.

To provide the aforementioned functionality of the example deployment consistency orchestrator (160), the example deployment consistency orchestrator (160) may include an automated update practices manager (162) and storage (170). Each component of the example deployment consistency orchestrator (160) is discussed below.

The automated update practices manager (162) may provide the above noted functionality of the example deployment consistency orchestrator (162). To provide the aforementioned functionality, the automated update practices manager (162) may include functionality to (i) obtain information from deployment managers (e.g., 140, FIG. 1.2) of any number of deployments regarding manual update practices enforced on the deployments by administrators, (ii) obtain deployment characteristics (e.g., 150, FIG. 1.2) from the deployments, (iii) classify the deployments into groups using the deployment characteristics, (iv) identify common update practices associated with each classification using the obtained manual update practices for the deployments of each deployment group, (v) generate tailored update practices for deployments of each group based on the common update practices associated with the groups, and (vi) enforce tailored update practice on one or more of the deployments.

To provide its functionality, the automated update practices manager (162) may send instructions via messages or other signaling methods to the computing device managers (e.g., 142, FIG. 1.2) of the deployments. The computing device managers may perform the instructions (e.g., obtaining and providing information, applying updates, etc.) in response to receiving the instructions. The automated update practices manager (162) may implement other models (e.g., subscription/publish systems) for cooperatively performing functionality with the deployments without departing from the invention.

When providing its functionality, the automated update practices manager (162) may store and utilize data structures in storage (170).

In one or more embodiments of the invention, the automated update practices manager (162) is implemented using a hardware device including circuitry. The hardware device may be, for example, a digital signal processor, a field programmable gate array, or an application specific integrated circuit. The automated update practices manager (162) may be implemented using other types of hardware devices without departing from the invention.

In one or more embodiments of the invention, the automated update practices manager (162) is implemented using computing code stored on a persistent storage that when executed by a processor performs the functionality of the automated update practices manager (162). The processor may be a hardware processor including circuitry such as, for example, a central processing unit or a microcontroller. The processor may be implemented using other types of hardware devices for processing digital information without departing from the invention.

When providing its functionality, the automated update practices manager (162) may perform all, or a portion, of the methods illustrated in FIGS. 2.1-2.3.

In one or more embodiments disclosed herein, the storage (170) is implemented using devices that provide data storage services (e.g., storing data and providing copies of previously stored data). The devices that provide data storage services may include hardware devices and/or logical devices. For example, storage (170) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (170) may include a memory device (e.g., a dual in line memory device) in which data is stored and from which copies of previously stored data are provided. In another example, storage (170) may include a persistent storage device (e.g., a solid state disk drive) in which data is stored and from which copies of previously stored data is provided. In a still further example, storage (170) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (170) may store data structures including a manual update practices repository (172), a consistent practices repository (174), a deployment specific automatic practices repository (176), a deployments characteristics repository (178), and deployment classifications (180). Each of these data structures is discussed below.

The manual update practices repository (172) may be a data structure that includes information regarding the update practices implemented by the administrators of one or more deployments. The information included in the update practices repository (172) may be obtained from the computing device managers of the deployments.

The information included in the manual update practices repository (172) may be implemented as, for example, a table that includes information similar to that described with respect to the manual update practices (e.g., 148, FIG. 1.2) maintained by the deployment managers of the deployments.

The consistent practices repository (174) may be a data structure that includes information regarding the common update practices implemented by the deployments of each classification. For example, the consistent practices repository (174) may include information derived from statistical analysis of the manual update practices repository (172) associated with each of the deployments of each classification.

For example, the consistent practices repository (174) may include a list. Each entry of the list may specify a classification and an update practice. The update practice may be derived based on a statistical analysis (e.g., average, mode, median, etc.) of that update practice enforced by the administrators of each deployment that has a classification of the specified by the entry. Each classification may include in any number of entries and each of these entries may specify a separate update practice (e.g., frequency of update, most commonly updated components, etc.). Any number of such entries may be consolidated into a list of update practices common to a particular classification.

The deployment specific automated update practices (176) may be a data structure that includes update practices that have been tailor for respective deployments. These update practices may be enforced on the corresponding deployments. The aforementioned update practices may be based on differences between the manual update practices enforced by administrators and the common update practices associated with classifications (e.g., included in the consistent update practices repository (174)) of which a deployment is a member. In other words, the difference between those update practices being employed by the administrators and the update practices being commonly employed by administrators of deployments of the same and/or similar classifications.

The deployments characteristics repository (178) may be a data structure that includes information that may be used to classify deployments. The information included in the deployments characteristics repository (178) may be obtained from the deployment managers (e.g., 142, FIG. 1.2) of the deployments. In other words, the deployment characteristics obtained by the deployment managers of the deployments may be obtained and stored in the deployments characteristics repository (178).

The deployment classifications (180) may be a data structure that includes information regarding the classifications of one or more deployments. For example, the information included in the deployments characteristics repository (178) may be used to classify the deployment. The deployment classifications (180) may specify to which classification (e.g., groups) the deployments belong. The deployments may belong to one or more classifications.

For example, the deployments may be classified by industry, by topology, by workloads, etc. into any number of different classifications. Consequently, the classifications may be used to divide the deployments into groups at different levels of granularity (e.g., member of an industry classification, member of an industry classification and a topology classification, etc.).

While the data structures stored in storage (170) have been described as including a limited amount of specific information, any of the data structures stored in storage (170) may include additional, less, and/or different information without departing from the embodiments disclosed herein. Further, the aforementioned data structures may be combined (with each other and/or other data structures), subdivided into any number of data structures, may be stored in other locations (e.g., in a storage hosted by another device), and/or spanned across any number devices without departing from the embodiments disclosed herein.

While the example deployment consistency orchestrator (160) has been described and illustrated as including a limited number of components for the sake of brevity, a deployment consistency orchestrator (160) in accordance with embodiments of the invention may include additional, fewer, and/or different components than those illustrated in FIG. 1.2 without departing from the invention.

Any of the data structures described with respect to FIGS. 1.2-1.3 may be implemented using one or more, for example, lists, tables, linked lists, databases, and/or any number and/or type of data structures.

Returning to FIG. 1.1, the deployment consistency orchestrator (110) may enforce update practices on the deployments (100). FIGS. 2.1-2.3 illustrate methods that may be performed by the deployment consistency orchestrator of the system of FIG. 1.1 when enforcing update practices.

FIG. 2.1 shows a flowchart of a method in accordance with one or more embodiments of the invention. The method depicted in FIG. 2.1 may be used to classify deployments in accordance with one or more embodiments of the invention. The method shown in FIG. 2.1 may be performed by, for example, a deployment consistency orchestrator (e.g., 110, FIG. 1.1). Other components of the system illustrated in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In step 200, deployment characteristics associated with a deployment are obtained.

In one or more embodiments of the invention, the deployment characteristics are obtained by sending a request for the deployment characteristics to a deployment manager of the deployment. In response to the request, the deployment manager may provide the deployment characteristics. The provided deployment characteristics may include all, or a portion, of the information included in a deployments characteristics (e.g., 150, FIG. 1.2) data structure maintained by the deployment.

The deployment characteristics may include any amount and type of information that may be used to classify the deployment. For example, the deployment characteristics may include (i) an industry type associated with the deployment, (ii) a use associated with the deployment, (iii) information regarding the components of the deployment, (iv) topological information regarding computing devices of the deployment, etc.

In step 202, the deployment is classified based on the deployment characteristics to obtain one or more classifications associated with the deployment.

In one of more embodiments of the invention, the deployment is classified by identifying one or more deployments that have similar characteristics to the deployment. For example, deployment characteristics associated with multiple deployments may be obtained. The deployments may be logically grouped based on commonalities between the deployment characteristics associated with each of the deployments.

For example, consider a scenario in which first deployments characteristics associated with a first deployment are obtained and second deployment characteristics associated with a second deployment are obtained. The first deployment characteristics may specify that the first deployment is associated with the automotive industry and that the first deployment is used for data storage. The second deployment characteristics may specify that the second deployment is associated with the automotive industry and that the second deployment is used for computer aided design. Based on these characteristics the first and second deployments may be classified as both being in an automotive industry classification. However, the first and second deployments may be classified in different use classification (i.e., data storage and computer aided design, respectively). Thus, the deployments may have two classifications the first (i.e., industry) being common and the second (i.e., use) being different.

In step 204, the one or more classifications are stored and associated with the deployment. The aforementioned classifications may be stored as part of a deployment classifications (e.g., 180, FIG. 1.3) data structure. For example, if the deployment classifications (e.g., 180, FIG. 1.3) data structure is implemented as a list, a new element may be added to the list that specifies that the element is associated with the deployment and the element may include identifiers or other information indicative of the one or more classifications.

The method may end following step 204.

Using the method illustrated in FIG. 2.1, a system in accordance with embodiments of the invention may be used to classify any number of deployments. Consequently, deployments used to implement similar processes may be identified using the classifications.

FIG. 2.2 shows a flowchart of a method in accordance with one or more embodiments of the invention. The method depicted in FIG. 2.2 may be used to identify consistent update practices in accordance with one or more embodiments of the invention. The method shown in FIG. 2.2 may be performed by, for example, a deployment consistency orchestrator (e.g., 110, FIG. 1.1). Other components of the system illustrated in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In step 210, manual update practices from deployments having a common classification are obtained.

In one or more embodiments of the invention, the manual update practices are obtained by sending one or more requests for manual update practices to respective deployment managers of the deployments. In response to the requests, the deployment managers may provide the manual update practices associated with the respective deployments. The provided manual update practices may include all, or a portion, of the information included in a manual update practices (e.g., 148, FIG. 1.2) data structure maintained by the respective deployment.

The manual update practices may include any amount and type of information that may be used to describe the manual update practices employed by a deployment. For example, the manual update practices from a deployment may include (i) a frequency of when updates are applied, (ii) identifiers of commonly updated components, (iii) a level of confidence with respect to how quickly updates are applied (e.g., reflecting whether there is a broad variation in update application over time), (iv) granular information regarding the types of updates that are quickly applied and other types of updates that are not quickly applied, etc.

The obtained manual update practices may be stored in a repository (e.g., 172) or other type of data structure for future use. In some cases, manual update practices may have already been obtained from one or more of the deployments. Consequently, only manual update practices from those deployments from which they haven't been obtained (and/or for those from which manual update practices have been obtained but exceed a predetermined age, e.g., stale) previously.

The common classification may be at any degree of granularity. For example, the common classification may be for a single classification type (e.g., industry type) or multiple classifications (e.g., industry type and use type). Manual update practices may only be obtained from a portion of the deployments of the deployments that match all of the classification included in the common classification. Consequently, the process illustrated in FIG. 2.2 may be repeated for any number of common classifications to generate consistent update practices associated with any number of different types of common classifications.

In step 212, a commonality analysis of the manual update practices associated with the deployments having a common classification is performed to obtain consistent update practices.

In one or more embodiments of the invention, the commonality analysis includes performing a statistical analysis of the manual update practices on a per type of update practices basis. For example, the manual update practices may include multiple types of update practices (e.g., frequency of update, commonly updated components, etc.). A statistical analysis (e.g., average, median, mode, inclusive set formation such as one of each component of an update practice type, et.) of each type of manual update practices may be performed. The results of the statistical analysis may be used as the consistent update practices.

For example, consider a scenario in which first manual update practices associated with a first deployment are obtained and second manual update practices associated with a second deployment are obtained. The first manual update practices may specify that updates are applied on average 3 months after they become available to the first deployment and that the most commonly updated components of the first deployment are network interface cards and operating systems. The second manual update practices may specify that updates are applied on average 5 months after they become available to the second deployment and that the most commonly updated components of the second deployment are network interface cards and storage controllers. Based on these manual update practices the average duration to update may be identified as 4 months (e.g., averaging 3 and 5) and that the most commonly updated components are network interface cards, operating systems, and storage controllers (e.g., forming an inclusive set).

In step 214, the consistent update practices associated with the common classification are stored. The consistent update practices may be stored as part of a consistent practices repository (e.g., 174, FIG. 1.3) data structure. For example, if the consistent practices repository (e.g., 174, FIG. 1.3) data structure is implemented as a list, a new element may be added to the list that specifies that the element is associated with the common classification (e.g., industry, use, etc.) and the element may include the consistent update practices.

The method may end following step 214.

Using the method illustrated in FIG. 2.2, a system in accordance with embodiments of the invention may identify a set of consistent update practices associated with a classification. As will be discussed below, these consistent update practices may be used to tailor automated practices for deployments to improve their operation and/or reduce update risk.

FIG. 2.3 shows a flowchart of a method in accordance with one or more embodiments of the invention. The method depicted in FIG. 2.3 may be used to enforce update practices on deployments in accordance with one or more embodiments of the invention. The method shown in FIG. 2.3 may be performed by, for example, a deployment consistency orchestrator (e.g., 110, FIG. 1.1). Other components of the system illustrated in FIG. 1.1 may perform all, or a portion, of the method of FIG. 2.3 without departing from the invention.

While FIG. 2.3 is illustrated as a series of steps, any of the steps may be omitted, performed in a different order, additional steps may be included, and/or any or all of the steps may be performed in a parallel and/or partially overlapping manner without departing from the invention.

In step 220, a change in update practice event for a deployment is identified. A change in an update practice event may be any event that indicates that the update practices being enforced on a deployment have become out of date.

For example, a change in consistent update practices associated with a classification associated with the deployment may be a change in an update practice event. In another example, a change in classification of a deployment may be a change in an update practice event. In a still further example, the change in update practice event may be a duration of time that has passed single the last change in consistent update practices event for the deployment occurred. The change in an update practice event may include additional and/or different types of events without departing from the invention.

In step 222, a difference between consistent update practices associated with the deployment and manual update practices associated with the deployment.

In one or more embodiments of the invention, the consistent update practices are associated with the deployment by a classification. As discussed with respect to FIGS. 2.1 and 2.2, deployments are classified and thereby associated with one or more classifications. Similarly, when consistent update practices are obtained as described with respect to FIG. 2.2, they are associated with a classification by virtue of the manual update practices of the deployments on which the consistent update practices are based. Thus, consistent update practices are associated with the deployment by virtue of the methods illustrated in FIGS. 2.1 and 2.2.

In one or more embodiments of the invention, the difference reflects how the manual update practices employed by administrators of the deployment diverges from the manual update practices commonly employed by administrators of multiple deployments of a similar classification. For example, if the administrators of the deployment on average apply updates 5 months after the updates become available but the common delay is 7 months, the difference between the practices is 2 months. There may be multiple differences between the manual update practices employed by the administrators of the deployment and the practices commonly employed by administrators of deployments of the same classification.

In step 224, deployment specific update practices associated with the deployment are obtained based on the difference. For example, the deployment specific update practices may be obtained by adding a change to the particular characteristic (e.g., update frequency, commonly updated component, etc.) of the manual update practices associated with the identified difference of step 222. The change may reflect the characteristic of the consistent update practices corresponding to the characteristics of the manual update practices associated with the identified difference.

For example, if the difference is associated with a frequency of update, the deployment specific update practices may be updated to reflect the frequency of update specified by the consistent update practices. Consequently, the resulting deployment specific practices may be tailored specifically for the deployment to ensure that the deployment applies or does not apply updates consistently with other similarly classified deployments.

The resulting deployment specific update practices may specify workflows for applying updates to components of the deployment at different levels of granularity. For example, a portion of the workflows may specify durations of time from when updates become available for application to when specific percentages of the updates must be applied (e.g., 30% within 3 months, 70% within 6 months, 100% within 9 months). In another example, a portion of the workflows may specify durations of time from when updates for specific components become available for application to when specific percentages of the updates must be applied (e.g., 30% of operating system updates within 3 months, 100% of processor updates within 6 months, 10% of firmware updates for network interface cards within 1 month, 100% of firmware updates for network interface cards within 2 months). In a further example, a portion of the workflows may specify components for which application of updates should be prioritized over application of updates for other components (e.g., updates for network interface cards should be applied before updates for databases).

In step 228, it is determined whether there are any other differences between the consistent update practices associated with the deployment and the manual update practices associated with the deployment. In other words, whether steps 222 and 224 have been performed enough times to address all of the differences between the consistent update practices associated with the deployment and the manual update practices associated with the deployment. For example, if there are 7 differences steps 222 and 224 may be performed 7 times.

If no additional differences are identified, the method may proceed to step 230. If at least one additional difference is identified, the method may return to step 222.

In step 230, the deployment specific update practices are enforced on the deployment.

In one or more embodiments of the invention, the deployment specific update practices are enforced by providing them to a deployment manager of the deployment. The deployment manager of the deployment may store them as automated update practices (e.g., 152, FIG. 1.2). When stored as automated update practices, the deployment manager may provide updates from an update repository (146) to component managers (e.g., 126, FIG. 1.2) to cause the components of the example deployment (120) to be updated in a manner consistent with the automated update practices (152). In turn, the components managers of each computing device may apply the updates to components as specified by the deployment manager.

In one or more embodiments of the invention, the deployment specific update practices are enforced by providing them to an administrator of the deployment. By doing so, the administrator may apply updates consistently with the deployment specific update practices.

The method may end following step 230.

Using the method illustrated in FIG. 2.3, a system in accordance with embodiments of the invention may enforce deployment specific update practices on deployments. By doing so, the system is more likely to apply commonly applied updates while avoiding uncommonly applied updates. Consequently, updates that are more likely to be, for example, stable due to high use rates or otherwise improve the functionality of the deployment may be applied while avoiding application of updates that are more likely to, for example, be unstable, cause a deployment to be susceptible to malicious attack, and/or otherwise reduce the functionality of the deployment.

Additionally, multiple deployment specific update practices may be enforced on a deployment via the method illustrated in FIG. 2.3. For example, the method may be performed multiple times for different classifications (e.g., step 222 different consistent update practices may be associated with the deployment by different classifications) thereby causing a multiple deployment specific update practices associated with different classifications to be enforced on the deployment.

To further clarify embodiments of the invention, a non-limiting example is provided in FIGS. 3.1-3.5. FIG. 3.1 shows a diagram of an example system similar to that of FIG. 1.1. FIGS. 3.2-3.5 show diagrams of tables associated with the system of FIG. 3.1 used to obtain deployment specific automated update practices that are enforced on a deployment. For the sake of brevity, only a limited number of components of the system of FIG. 1.1 are illustrated in FIG. 3.1.

Example

Consider a scenario as illustrated in FIG. 3.1 in which a deployment consistency orchestrator (310) is providing update consistency services to four deployments (300, 302, 304, 306). At a first point in time, the deployment consistency orchestrator (310) begins providing services to a new deployment (308).

A first of the deployments (300) is used for operating a banking automated teller network. A second of the deployments (302) is used for operating a banking branch storage. A third of the deployments (304) is also used for operating a banking branch storage. A fourth of the deployments (306) is used for automotive design. The new deployment (308) is used for banking branch storage.

The first three deployments (300, 302, 304) have been classified as being used in the banking industry and the fourth deployment (306) has been classified as being used in the automotive industry. The first deployment (300) has also been classified as been used in a distributed manner while the second and third deployments (302, 304, respectively) been classified as being used locally. The fourth deployment has also been classified as being used for design.

To classify the new deployment, the deployment consistency orchestrator (310) obtains deployment characteristics from the new deployment. The deployment characteristics are used by the deployment consistency orchestrator (310) to classify the new deployment as being used in the banking industry and locally.

To provide consistency services, the deployment consistency orchestrator (310) obtains manual update practices from the four deployments (300, 302, 304, 306). The obtained practices and classifications of the deployments are shown in FIG. 3.2

FIG. 3.2 shows a table that includes the classification of each of the deployments (second row) and the manual update practices (rows 3-5) employed by the administrators of the respective deployments. To identify consistent update practices, the deployment consistency orchestrator (310) compares the classifications of the new deployment (banking, local) to the classifications of the four deployments. Based on the comparison, the deployment consistency orchestrator (310) identifies that the second and third deployment have the same classifications as the new deployment. Consequently, as illustrated (by the Xs overlaying the second and fifth columns) in FIG. 3.3, the deployment consistency orchestrator (310) eliminates the manual update practices of the first and fourth deployments from being considered when identifying consistent update practices for deployments classified as banking, local.

To obtain the consistent update practices, the deployment consistency orchestrator (310) performs a statistical analysis of each of the manual updates practices in rows 3-5 of columns 3 and 4. Specifically, the deployment consistency orchestrator (310) averages the update status (e.g., percentage of available updates that have been applied) of the second deployment with the update status of the third deployment to obtain consistent update practice of 50% for update status as illustrated in FIG. 3.4.

The deployment consistency orchestrator (310) performs similar averaging for the update frequency resulting in a consistent update practices of (i) ensuring that 33% of available updates are applied between 1 and 3.5 months after becoming available, (ii) ensuring that 33% of available updates are applied between 4 and 7 months after becoming available, and (iii) ensuring that 33% of available updates are applied between 7 and 12 months from becoming available.

Similarly, the deployment consistency orchestrator (310) performs averaging of the average time between updates of frequently updated components (shown in row 5) resulting in the average time between updates for monolithic components (MC) being 17 months, network interface cards being 16.5 months, and operating system drivers being 1.5 months.

Using the consistent update practices, the deployment consistency orchestrator (310) obtains deployment specific automated update practices for the new deployment as illustrated in FIG. 3.5. Specifically, as seen in FIG. 3.5, the deployment consistency orchestrator (310) obtains manual update practices (column 2) from the new deployment and compares them to the consistent update practices (column 3) to determine whether a corresponding workflow should be added to the deployment specific automated update practices (column 4) for the new deployment.

As seen from row 3, there is no difference between the update status employed by the new deployment and the update status of the consistent update practices. Consequently, no workflow is added to the deployment specific automated update practices for update status. However, there are differences in the update frequency (row 4) and the average time between updates of frequently updated components (row 5). Accordingly, workflows matching the consistent update practices are added to the deployment specific automated update practices for the new deployment.

Once the deployment specific automated update practices are obtained, the deployment consistency orchestrator (310) sends the practices to a deployment manager (not shown) of the new deployment to cause the practices to be automatically applied to the new deployment.

Consequently, the update frequency and average time between updates of frequently updated components for updates that may be applied to components of the new deployment are automatically implemented. Accordingly, the update behavior of the new deployment may be made similar to that of the consistent update practices resulting in updates being applied or not applied in a manner consistent with other deployments of similar classifications.

End of Example

Any of the components of FIG. 1.1 may be implemented using distributed computing devices. As used herein, a distributed computing device refers to functionality provided by a logical device that utilizes the computing resources of one or more separate and/or distinct computing devices.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a method and system for ensuring that the update practices implemented by a deployment are similar to those implemented by similar deployments. By doing so, the deployment may be more likely to apply updates that are beneficial while avoiding application that are detrimental to the functionality of the deployment.

Thus, embodiments of the invention may address the problem of risks associated with applying updates to components of a system. Specifically, embodiments of the invention may reduce risks by conforming the update behavior of the system to those commonly implemented by, for example, administrator of other deployments owned, operated, or otherwise used by other organizations.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A deployment consistency orchestrator for providing update consistency services to deployments, comprising:
   a processor;
   a storage device for storing:
      a manual update practice repository for storing manual update practices associated with respective deployments, and
      a deployment characteristics repository for storing characteristics associated with respective deployments; and
   an automated update practices manager circuit programmed to:
      identify a change in an update practice event for a deployment of the deployments;
      in response to identifying the change in the update practice event:
         identify, using the deployment characteristics repository, a portion of the deployments having a classification that is similar to a classification of the deployment;

identify a portion of the manual update practices repository associated with the portion of the deployments;

perform a commonality analysis using the portion of the manual update practices to identify consistent update practices associated with the classification of the deployment; and automatically deploy components of the deployment according to the consistent update practices to enforce the consistent update practices.

2. The deployment consistency orchestrator of claim 1, wherein the characteristics associated with respective deployments comprise an industry type of each of the deployments.

3. The deployment consistency orchestrator of claim 1, wherein enforcing the consistent update practices comprises:

identifying a difference between the consistent update practices and the manual update practices associated with the deployment;

obtaining revised deployment specific update practices associated with the deployment based on the difference; and applying the revised deployment specific update practices to the deployment.

4. The deployment consistency orchestrator of claim 1, wherein enforcing the consistent update practices associated with the classification of the deployment on the deployment comprises:

automatically updating firmware of at least one component of the deployment at a first rate that is different from a second rate at which firmware of the at least one component of the deployment was manually updated prior to enforcement of the consistent update practices.

5. The deployment consistency orchestrator of claim 1, wherein performing the commonality analysis comprises:

identifying firmware update rates of a plurality of deployments of the portion of the deployments using the manual update practices repository;

averaging the firmware update rates to obtain an average firmware update rate; and adding the average firmware update rate to the consistent update practices.

6. The deployment consistency orchestrator of claim 5, wherein performing the commonality analysis further comprises:

identifying a most commonly updated component of each deployment of the portion of the deployments using the manual update practices repository; and adding the most commonly updated component to the consistent update practices.

7. The deployment consistency orchestrator of claim 6, wherein performing the commonality analysis further comprises:

identifying firmware update frequency of a plurality of deployments of the portion of the deployments using the manual update practices repository;

averaging the firmware update frequencies to obtain an average firmware update frequency; and adding the average firmware update frequency to the consistent update practices.

8. A method for providing update consistency services to deployments, comprising:

identifying a change in an update practice event for a deployment of the deployments;

in response to identifying the change in the update practice event:

identifying, using a deployment characteristics repository that stores characteristics associated with respective deployments, a portion of the deployments having a classification that is the same as a classification of the deployment;

identifying a portion of a manual update practices repository associated with the portion of the deployments, wherein the manual update practices repository stores manual update practices associated with the respective deployments;

performing a commonality analysis using the portion of the manual update practices to identify consistent update practices associated with the classification of the deployment; and automatically deploying components of the deployment according to the consistent update practices to enforce the consistent update practices.

9. The method of claim 8, wherein the characteristics associated with respective deployments comprise an industry type of each of the deployments.

10. The method of claim 8, wherein enforcing the consistent update practices comprises:

identifying a difference between the consistent update practices and the manual update practices associated with the deployment;

obtaining revised deployment specific update practices associated with the deployment based on the difference; and applying the revised deployment specific update practices to the deployment.

11. The method of claim 8, wherein enforcing the consistent update practices associated with the classification of the deployment on the deployment comprises:

automatically updating firmware of at least one component of the deployment at a first rate that is different from a second rate at which firmware of the at least one component of the deployment was manually updated prior to enforcement of the consistent update practices.

12. The method of claim 8, wherein performing the commonality analysis comprises:

identifying firmware update rates of a plurality of deployments of the portion of the deployments using the manual update practices repository;

averaging the firmware update rates to obtain an average firmware update rate; and adding the average firmware update rate to the consistent update practices.

13. The method of claim 12, wherein performing the commonality analysis further comprises:

identifying a most commonly updated component of each deployment of the portion of the deployments using the manual update practices repository; and adding the most commonly updated component to the consistent update practices.

14. The method of claim 13, wherein performing the commonality analysis further comprises:

identifying firmware update frequency of a plurality of deployments of the portion of the deployments using the manual update practices repository;

averaging the firmware update frequencies to obtain an average firmware update frequency; and adding the average firmware update frequency to the consistent update practices.

15. A non-transitory computer readable medium comprising computer readable program code, which when executed by a computer processor enables the computer processor to perform a method for providing update consistency services to deployments, the method comprising:

identifying a change in an update practice event for a deployment of the deployments;

in response to identifying the change in the update practice event:

identifying, using a deployment characteristics repository that stores characteristics associated with respective deployments, a portion of the deployments having a classification that is the same as a classification of the deployment;

identifying a portion of a manual update practices repository associated with the portion of the deployments, wherein the manual update practices repository stores manual update practices associated with the respective deployments;

performing a commonality analysis using the portion of the manual update practices to identify consistent update practices associated with the classification of the deployment; and automatically deploying components of the deployment according to the consistent update practices to enforce the consistent update practices.

16. The non-transitory computer readable medium of claim 15, wherein the characteristics associated with respective deployments comprise an industry type of each of the deployments.

17. The non-transitory computer readable medium of claim 15, wherein enforcing the consistent update practices comprises:

identifying a difference between the consistent update practices and the manual update practices associated with the deployment;

obtaining revised deployment specific update practices associated with the deployment based on the difference; and applying the revised deployment specific update practices to the deployment.

18. The non-transitory computer readable medium of claim 15, wherein enforcing the consistent update practices associated with the classification of the deployment on the deployment comprises:

automatically updating firmware of at least one component of the deployment at a first rate that is different from a second rate at which firmware of the at least one component of the deployment was manually updated prior to enforcement of the consistent update practices.

19. The non-transitory computer readable medium of claim 15, wherein performing the commonality analysis comprises:

identifying firmware update rates of a plurality of deployments of the portion of the deployments using the manual update practices repository;

averaging the firmware update rates to obtain an average firmware update rate; and adding the average firmware update rate to the consistent update practices.

20. The non-transitory computer readable medium of claim 19, wherein performing the commonality analysis further comprises:

identifying a most commonly updated component of each deployment of the portion of the deployments using the manual update practices repository; and adding the most commonly updated component to the consistent update practices.

* * * * *